(No Model.)
O. M. BOWGHNER & G. SMITH.
VEHICLE WHEEL.
No. 563,646. Patented July 7, 1896.
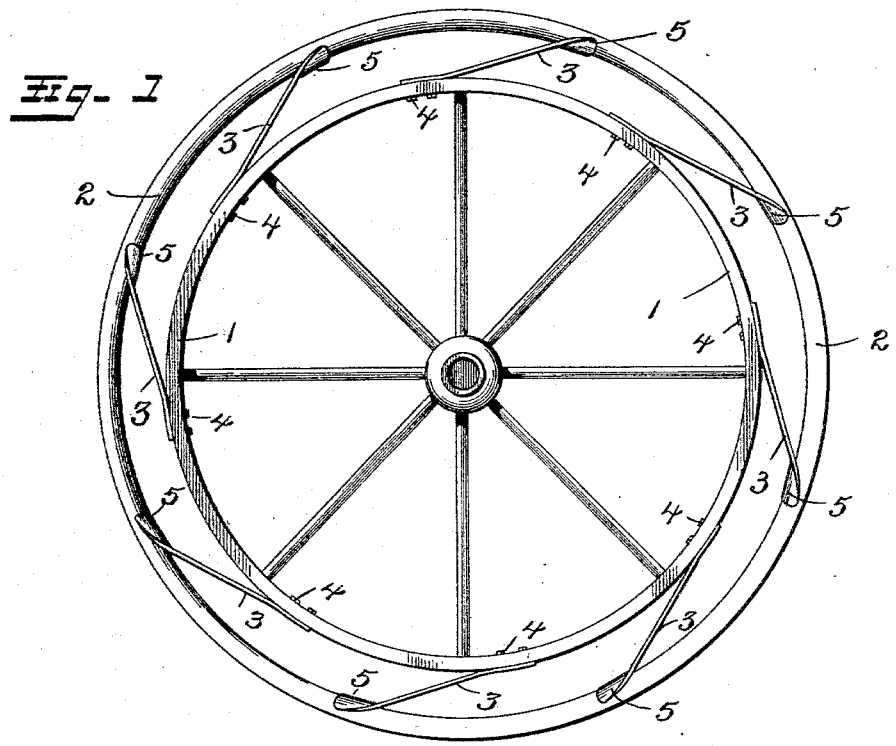
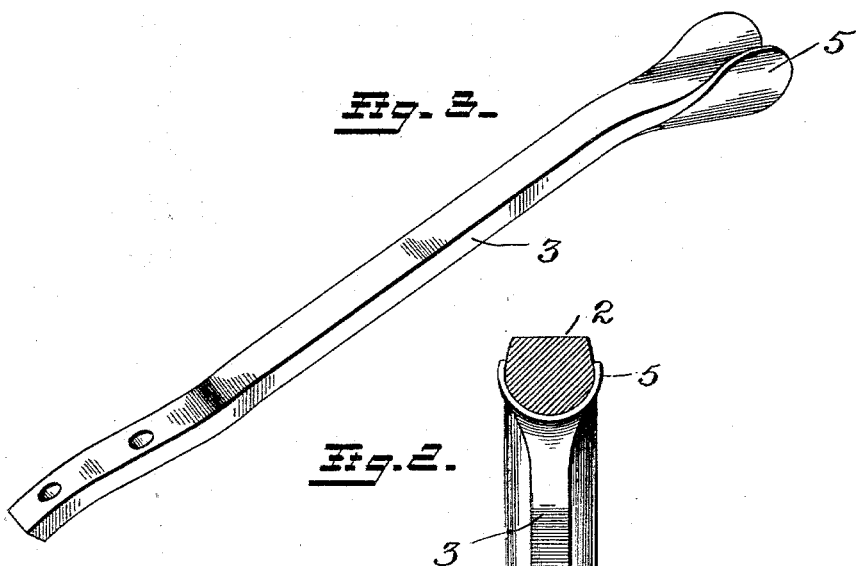
Witnesses
H. J. Koerth
R. M. Smith
Inventors
Oliver M. Bowghner
and
Grant Smith
By their Attorneys.
C. A. Snow & Co.

UNITED STATES PATENT OFFICE.

OLIVER M. BOWGHNER AND GRANT SMITH, OF AUGUSTAVILLE, PENNSYLVANIA.

VEHICLE-WHEEL.

SPECIFICATION forming part of Letters Patent No. 563,646, dated July 7, 1896.

Application filed May 28, 1895. Serial No. 550,991. (No model.)

*To all whom it may concern:*

Be it known that we, OLIVER M. BOWGHNER and GRANT SMITH, citizens of the United States, residing at Augustaville, in the county of Northumberland and State of Pennsylvania, have invented a new and useful Vehicle-Wheel, of which the following is a specification.

Our invention relates to an improvement in wheels designed particularly for use in the construction of bicycles and similar light vehicles, and the object in view is to improve cushioned vehicle-wheels by providing an extra or outer rim of such construction that the springs arranged between said outer and the main or inner rim will exert their tension to hold the outer rim at the proper distance from the inner rim and will be held from displacement without fastening devices puncturing or passing through the outer rim.

Further objects and advantages of this invention will appear in the following description, and the novel features thereof will be particularly pointed out in the appended claim.

In the drawings, Figure 1 is a view of a vehicle-wheel constructed in accordance with our invention. Fig. 2 is an enlarged transverse section of a portion of the same, illustrating the manner in which the outer extremities of the springs are attached to the outer rim. Fig. 3 is a detail perspective view of one of the springs.

Similar numerals of reference indicate corresponding parts in all the figures of the drawings.

The main rim 1 of the wheel to which our improvement is applied is surrounded by a cross-sectionally plano-convex outer or auxiliary rim 2, arranged in the same plane with the main rim, with an intervening space in which are arranged connecting-springs 3. The main or inner rim is strengthened by the usual spokes, which connect it with the hub, and is not exposed to contact with the surface traversed, and, therefore, we have found it practical to attach the inner ends of said springs by means of fastening-bolts 4, which puncture the same. The outer or auxiliary rim, however, forms the tread of the wheel, and, therefore, we have devised means for attaching the outer ends of the springs to this rim, whereby puncturing or perforating the same is avoided. The outer rim is made slightly more than semicylindrical in cross-section, with its flat tread formed at its outer circumference of slightly less width than the greatest horizontal thickness of the rim. In other words, the rim is contracted in width toward its tread. The outer end of each spring is flattened and enlarged laterally or widened, as shown at 5, to form the opposite ears, which are bent outwardly to lie in contact with the side surfaces of the outer rim, as clearly shown in Fig. 2, and the extremities of these ears are pinched toward each other to firmly clamp the rim, the extremities of the ears being located beyond the point of greatest width of the rim. No bolts or other fastening devices are necessary with this construction of spring, and if the strain upon the wheel is sufficient to necessitate the yielding of the parts thereof in the direction of rotation the outer rim may turn independently of the inner rim without in any way fracturing or rendering inoperative the connection between the outer extremities of the springs and said outer rim. In other words, the means for fastening the springs to the outer rim are such as to yield before the wheel will be fractured.

In addition to yielding circumferentially, the connection between the outer ends of the springs and the outer rim is adapted to allow a slight rocking movement of the springs by reason of the convex inner circumference of the outer rim, and thus allow relative lateral yielding movement of the rims without causing displacement.

Having described our invention, what we claim is—

A vehicle-wheel having concentric inner and outer rims, the outer rim having a cross-sectionally-convexed inner circumference and being reduced in width toward its outer circumference or tread, and springs secured at their inner ends to the inner rim and provided at their outer ends with flattened lateral ears bent outwardly to bear against the side surfaces of the outer rim and extending beyond the thickest portion of the outer rim to prevent radial displacement and form a connection capable of yielding laterally and circumferentially, substantially as specified.

In testimony that we claim the foregoing as our own we have hereto affixed our signatures in the presence of two witnesses.

OLIVER M. BOWGHNER.
GRANT SMITH.

Witnesses:
J. SIMPSON KLINE,
I. CLINTON KLINE.